United States Patent [19]
Pezant

[11] Patent Number: 5,844,232
[45] Date of Patent: Dec. 1, 1998

[54] SLIT-TYPE SUN SENSOR HAVING A PLURALITY OF SLITS

[75] Inventor: Christian Pezant, Villecresnes, France

[73] Assignee: U.S. Philips Corporation, New York, N.Y.

[21] Appl. No.: 800,702

[22] Filed: Feb. 14, 1997

[30] Foreign Application Priority Data

Feb. 14, 1996 [FR] France .................................. 9601813

[51] Int. Cl.$^6$ ........................................................ G01J 1/20
[52] U.S. Cl. ................................... 250/203.2; 250/206.1; 244/164; 701/4; 701/13
[58] Field of Search ........................... 250/203.4, 206.1; 244/164, 168, 171; 701/4, 13, 226

[56] References Cited

U.S. PATENT DOCUMENTS

| | | | |
|---|---|---|---|
| 3,819,940 | 6/1974 | Laws .................................. | 250/227.11 |
| 4,018,532 | 4/1977 | Fletcher et al. ....................... | 250/203.4 |
| 4,810,870 | 3/1989 | Tsuno et al. .............................. | 356/141 |
| 4,874,937 | 10/1989 | Okamoto . | |
| 4,997,146 | 3/1991 | Weyandt, Jr. ............................ | 244/164 |
| 4,999,483 | 3/1991 | Okamoto ............................... | 250/203.1 |
| 5,080,307 | 1/1992 | Smay et al. .............................. | 244/164 |
| 5,189,295 | 2/1993 | Falbel .................................... | 250/206.2 |
| 5,698,842 | 12/1997 | Fallon et al. .......................... | 250/203.4 |

*Primary Examiner*—Stephone B. Allen
*Attorney, Agent, or Firm*—Oblon, Spivak, McClelland, Maier & Neustadt, P.C.

[57] ABSTRACT

This sensor, which is connected to an attitude control system comprising a coarse attitude detector on a mobile craft, has an array of photodetectors (1) and a slit (3) interposed between the array and the sun. According to the invention, it comprises a sun sensor having a plurality of parallel slits (3, 4, 5), each slit detecting a sector ($C_1$, A, $C_2$) of the overall field of view for a first angular position of the sun to be measured, with a small overlap between adjacent sectors. Said sun sensor further comprises calculation means (31) which receive, on the one hand, information about the insolation of the array and, on the other hand, information originating from the attitude control system (inertial unit 32), in combination with the date, indicating in which sector of the field of view the sun is situated, and which derive from said information the angular position of the sun in said overall field of view.

10 Claims, 3 Drawing Sheets

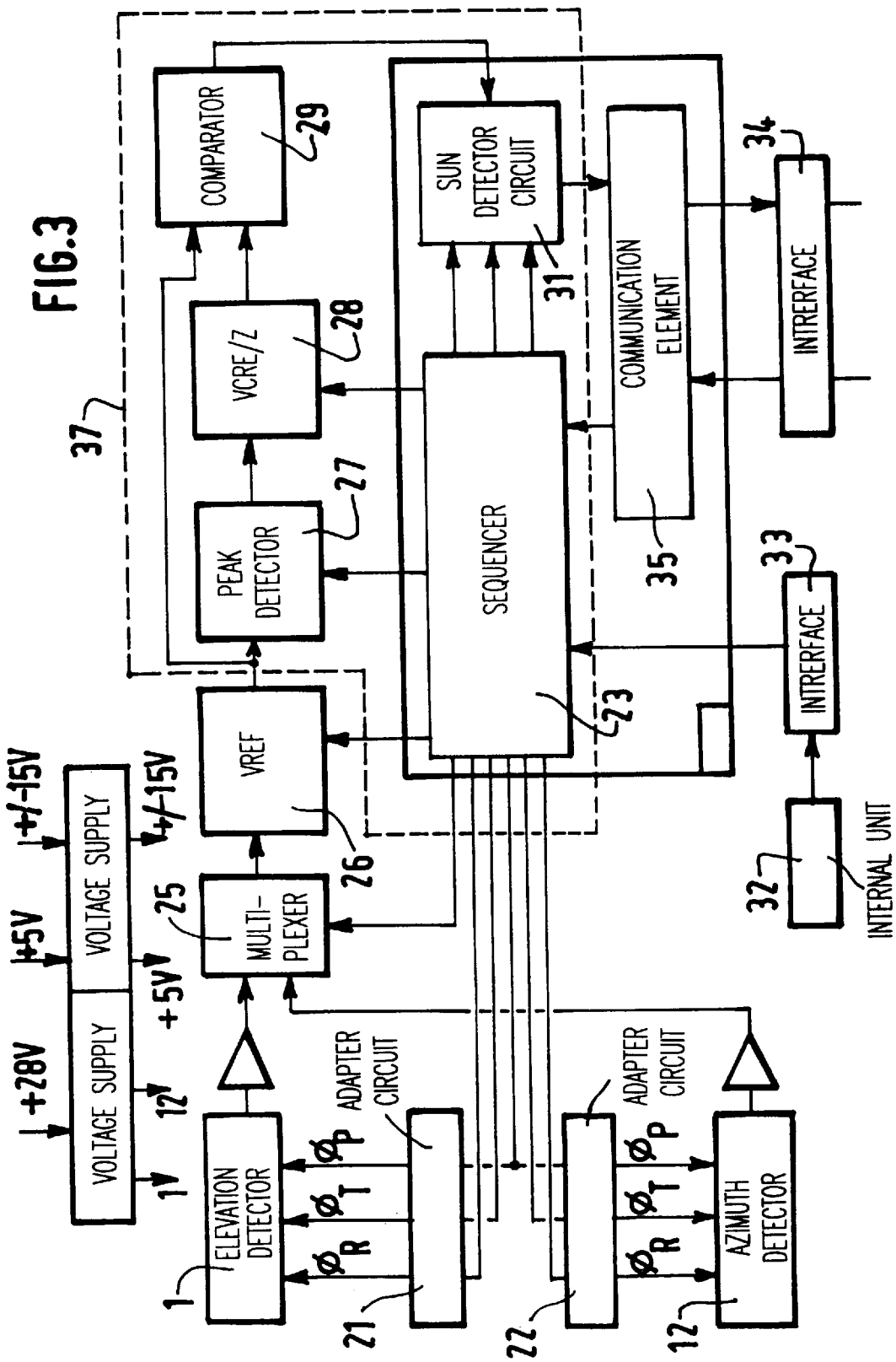

SLIT-TYPE SUN SENSOR HAVING A PLURALITY OF SLITS

BACKGROUND OF THE INVENTION

1. Field of the Invention

The invention relates to a slit-type sun sensor which, as well as at least one coarse attitude detector, is connected to an attitude control system on a mobile craft, which sensor is of the kind using a linear array of photodetectors extending at an angle relative to a slit interposed between said array and the sun.

The invention also relates to a combination of a slit-type sun sensor and an attitude control system comprising at least one coarse attitude detector.

2. Discussion of Background

It is possible to use devices of different types for attitude control of an artificial satellite. In particular, it is known to use gyroscopes by means of which it is possible to measure the angular movements and, by integration, the recurrent position starting from an initial position. The initial position and its update are obtained by means of detectors (based on optics, gravity, magnetometry . . . ), including star trackers and terrestrial detectors.

An orientation problem similar to that of satellites occurs for locating, in an autonmous way in view of its guidance, a vehicle which is movable on the soil of a planet (Mars) or the moon, i.e. for the independent location of a prototype of a movable planetary robot. For this purpose, such a vehicle also comprises an attitude control system, i.e. an attitude control unit, in the present case with a platform provided with an inertial unit. An attitude detector, in conjunction with the universal time and the ephemerides, enables an initial position for the vehicle on the planet where it is situated to be determined by suitable processing. In order to ensure a finer detection of the attitude of the vehicle it is necessary to use a star tracker or a sun sensor in conjunction with the attitude control unit for finding the azimuth and elevation angles. For this fine detection it can be envisaged to use a star tracker, a matrix detector or a PSD (Position Sensitive Device). However, matrix detectors lead to a higher complexity and appear to be a restrictive solution for such a use. Owing to its single-element design the PSD cannot extract a part of the projected scene; measurement would therefore be disturbed by the brightness of the sky and the soil. Moreover, the lower resolution of this type of detector (1000 to 2000) would require the use of a plurality of detector elements to cover the elevation angle (solar altitude). For this last application it is preferred to use, instead of the afore-mentioned devices, slit-type solar sensors utilizing an array of photodetectors. Such sensors are known from U.S. Pat. No. 4,810,870, FIGS. 3 to 6 and the corresponding description.

The slit and the array of photodetectors are generally disposed in directions perpendicular to one another. The projection of the slit provides an image in the form of light traces, which intersects the array in a point. The position of this point, which is representative of an angular position of the sun, is determined by comparatively simple processing of the signal supplied by the detector. The length of the array, which is related to the distance between the slit and the array, determines the field and the measurement accuracy of the sun sensor. The length of the slit determines its transverse field of view (insensitive axis). To form a sun sensor having two axes, which is the case most frequently, two sensors of this type are required, one for each measurement axis; in principle, although this is not necessary, the measurement axes of the two sensors are disposed perpendicularly to one another.

For measuring the elevation or the azimuth angle (pitch angle and yaw angle, respectively, for an artificial satellite) an accuracy of the order of one minute of arc is required. Currently, this can be achieved for angles up to approximately 30° by means of an array comprising 1500 to 2000 photodetectors. However, for larger angles, for example particularly between 60° and 90°, it is necessary to use arrays comprising 2 to 3 times as many detectors, which gives rise to problems of three types. In the first place, it is necessary to increase the size and weight of the sun sensor. Secondly, it is no longer possible to use short arrays already approved for aerospace applications and the approval of longer arrays leads to a substantial price increase. Thirdly, arrays comprising three times as many photodetectors exhibit a readout time multiplied by 3, i.e. more complex electronics.

It is therefore advantageous if short arrays, which have already been tested and approved, can also be used for measuring angles up to 90°, as is the case for the measurement of elevation angles of an automatic planetary vehicle.

SUMMARY OF THE INVENTION

It is the main object of the present invention to provide a sun sensor capable of detecting large angles of incidence of the sun with a satisfactory accuracy without an increase in size and price of the sensor.

This object is achieved in that a sun sensor of the type defined in the opening paragraph is characterized in that it comprises at least a first sun sensor having a plurality of slits disposed in parallel, each slit serving to detect a sector of the overall field of view of a first angular position of the sun to be measured, in such a manner that at least one of the photodetectors of said array is always exposed to the sun, said first sun sensor further comprising calculation means which receive, on the one hand, information about the exposure of said array to the sun and, on the other hand, information originating from said attitude control system, in combination with the date, indicating in which sector of the field of view the sun is situated, and which derive from said information the angular position of the sun in said overall field of view.

The knowledge of the local time and of an approximate position of the satellite or the vehicle on the soil of the planet, which information is provided by a first coarse sensor, makes it possible to estimate a coarse position of the sun, with an accuracy of a priori between one and a few degrees. Since a plurality of slits are disposed before the arrays of photodetectors, this coarse position indicates, by means of a prior calibration, through which slit the sunlight is incident on a detector of the array, which implies a fixed angle of average inclination for the sun, which angle is representative of the sector of the overall field which can be measured by the relevant slit. In order to obtain the angle of inclination of the sun the particular value derived from the position of the photodetector (the pixel) exposed on the array should be added to the value of this fixed angle.

The calculation means required for the measurement of this angle of inclination can form part of either the electronic processing means of the attitude control system (of the inertial unit), or that of the sensor.

In the case of a slit-type sensor intended for an automatic planetary vehicle, the attitude control unit comprises two slit-type sun sensors, a first one having a plurality of slits in accordance with the invention, for measuring the elevation angle, and a second one of a known type having a single slit, for measuring the azimuth angle, whose range is small, i.e. of the order of 10°.

For a low-orbit artificial satellite whose attitude is to be measured, i.e. particularly the pitch angle and yaw angle, an attitude control unit is used whose platform is provided with two sun sensors with a plurality of slits in accordance with the invention, for measuring said pitch angle and yaw angle.

BRIEF DESCRIPTION OF THE DRAWINGS

The following description with reference to the accompanying drawings, given by way of non-limitative examples, will make it possible to understand how the invention can be realized.

FIG. 3 is the block diagram of the analog version of the electronic circuit of the sun sensor of FIGS. 2A and 2B.

DESCRIPTION OF THE PREFERRED EMBODIMENTS

In the Figures elements having the same functions bear the same reference symbols.

Figure 1:
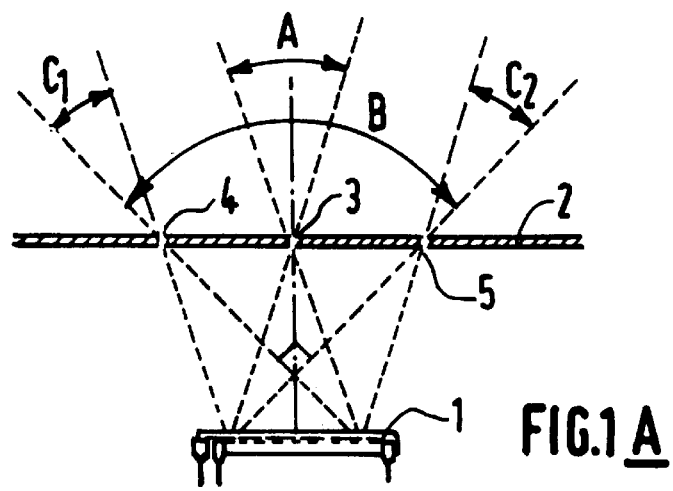
FIGS. 1A and 1B are diagrammatic lateral sectional view of a sun sensor in accordance with the invention, taken along the sensitive axis in FIG. 1A and on the insensitive axis in FIG. 1B.
Figure 1:
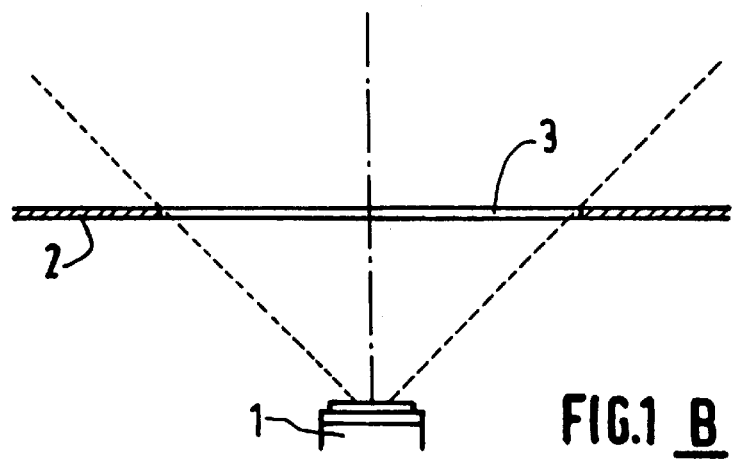

FIGS. 1A and 1B, which serve to elucidate the operation of the sun sensor in accordance with the invention, only show the principal elements, i.e. an array of photodetectors 1 and an opaque plate 2 provided with slits 3, 4 and 5. The housing carrying the elements 1 and 2 is not shown for the simplicity of the drawing, which opaque housing also serves to prevent the entry of spurious light otherwise than through the slits 3, 4 and 5. Preferably, as shown, the parallel slits 3, 4, 5 are disposed perpendicularly to the array 1 and at a few centimeters from the latter, the central slit 3 being situated straight above the center of the array 1. The distances between the slits 3 and 4 and the slits 3 and 5 are equal and slightly smaller than the length of the array 1. This array is for example the array which is commercially available from Thomson-CSF under the designation TH7811A and which has 1728 pixels.

A prior-art slit-type sun sensor only has the central slit 3, by means of which an angle within the radiation field A can be measured, which angle is slightly larger than 30 degrees in the Figure.

Conversely, the sun sensor with 3 slits in accordance with the invention makes it possible to measure the angle over the overall field B of 90 degrees, which consists of three adjacent sectors: $C_1$, detected via the slit 4, then A, detected via the slit 3, and subsequently $C_2$, detected via the slit 5 ($C_1=C_2$ in FIG. 1A). It is to be noted that the passage of the sun through each of the three sectors results in the array 1 being scanned over its entire length by the image of the slit associated with each sector, with a partial coverage of typically 10% between adjacent sectors. In the absence of additional information this would result in indetermination about the actual position of the sun. This indetermination is eliminated by the additional indication of the sector in which the sun is situated during the measurement of the angle, which indication is provided by the inertial unit, in conjunction with the exact measurement instant, which information is necessarily present in the attitude control unit, which also comprises the sun sensor.

With respect to each sector, the sun sensor shown in FIGS. 1A and 1B thus behaves as a prior-art sensor, for which a prior calibration enables a precise correspondence to be obtained between the sequence number (the position) of each photodetector of the array and an associated angle of inclination for the sun. According to the invention each photodetector position is associated with three possible angles of inclination for the sun, of which the coarse position information received from the inertial unit indicates which should be selected as the true position.

FIG. 2A is an top view showing a two-axis sun sensor intended for the autonomous location of an automatic planetary vehicle. For such a vehicle it should be possible to cover elevation ranges of ±45°, for which reason a sun sensor as shown in FIG. 1A with three slits 7, 8 and 9 is used. On the other hand, the azimuth angle can be limited to 10°, which permits the use of a known slit-type sensor with a single slit 11 in conjunction with an array of photodetectors 12.

Figure 2:
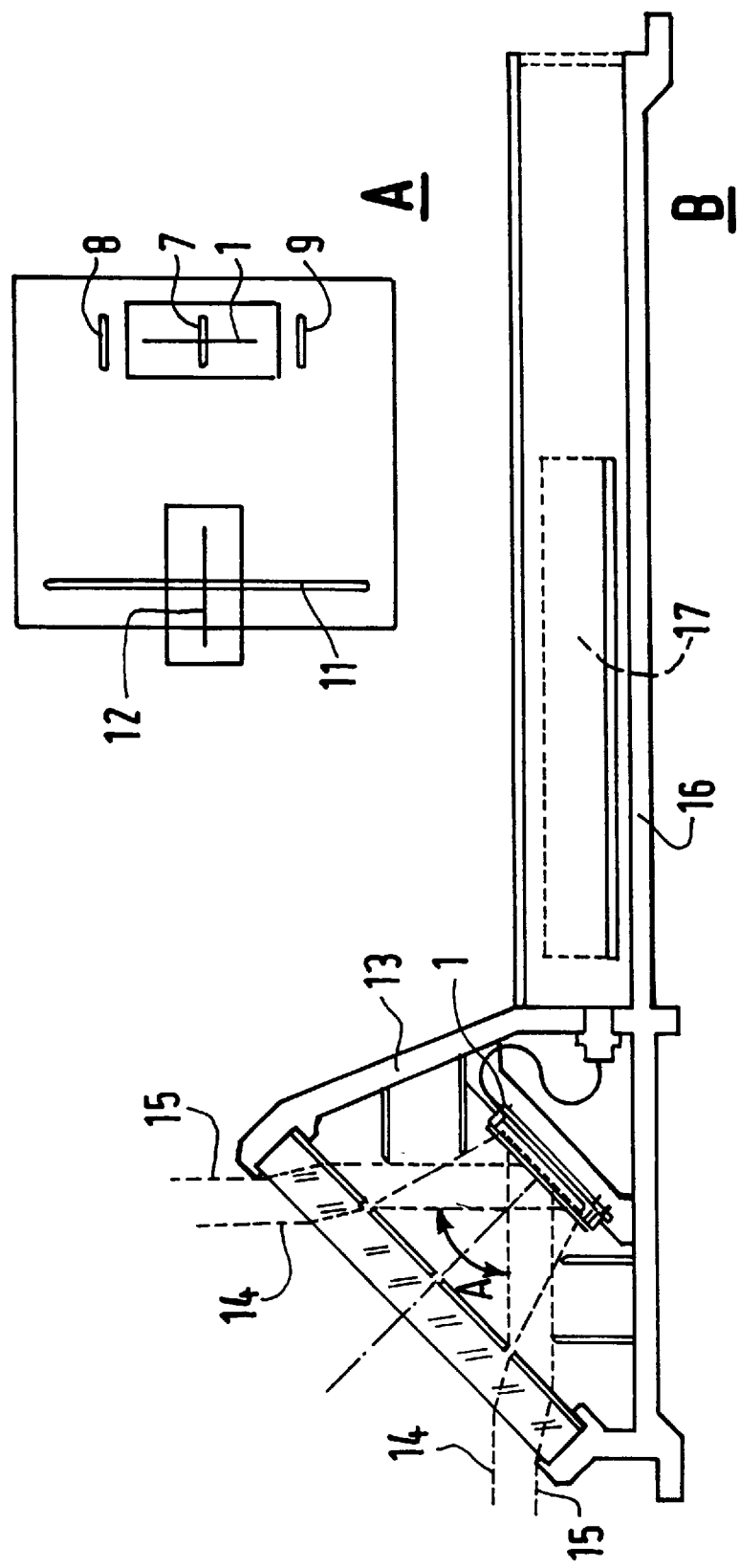
FIG. 2A is an underneath view of a sun sensor embodying the invention, intended for elevation measurement and for the autonomous location of an automatic planetary vehicle.
FIG. 2B is a side view of the sensor of FIG. 2A, provided with a housing and an electronic module, the special shape being dictated by the fact that in the present case the sensor forms the hood of the inertial unit.

The arrays 1 and 12, for example of the afore-mentioned type TH7811A, are disposed in mutually perpendicular directions, which also applies to the slit 11 with respect to the slits 7, 8 and 9. It is to be noted that the size of the head of the sun sensor shown in FIG. 2 is dictated mainly by the great length of the slit 11 of the azimuth detector in order to cover the elevation ranges of ±45°, as is also the case for the sun sensor shown in FIG. 1B (insensitive axis). Conversely, the lengths of the slits 7, 8 and 9 are small in accordance with the required small azimuth ranges of ±5°.

For a correct coverage of the elevation and azimuth angles the head of the slit-type sun sensor is disposed in its housing 13, see FIG. 2B, at an angle of 45° with respect to the horizontal.

In FIG. 2B the field of view of the elevation detector is shown in broken lines 14 and the filed of view of the azimuth detector (in the perpendicular direction) in broken lines 15.

Figure 4:
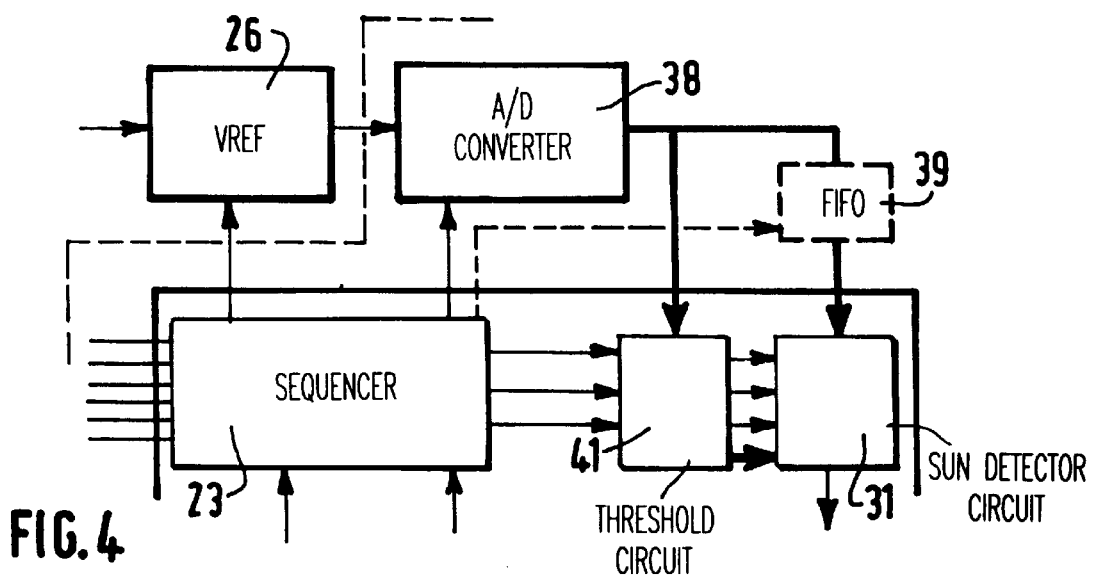
FIG. 4 shows a modified part of the diagram of FIG. 3, which enables a digital version to be obtained for the calculation of the elevation angle and the azimuth angle.

The housing 13 is integrally connected to a rack 16 which accommodates the electronic equipment 17 necessary for controlling the arrays of photodetectors 1 and 12 and for processing the electric signals supplied by them, which processing will be explained hereinafter with reference to FIGS. 3 and 4.

The left-hand part of FIG. 3 shows the elevation detector 1 and the azimuth detector 12, which are controlled, via level adapter circuits 21 and 22, respectively, by a sequencer 23, for which there is an integration phase $\phi_p$, a transfer phase $\phi_T$ into a shift register, and a register read-out phase $\phi_R$. After amplification the output signals of the detectors 1 and 12 are multiplexed in a multiplexer 25, which makes it possible to have only one signal processing chain. The multiplexer 25 is followed by the following series of blocks:

- a block 26 for adjusting the signal with respect to a reference voltage VREF,
- a peak detection circuit 27 which detects the maximum signal VCRE,
- a circuit 28 for storing the threshold VCRE/2, and
- a comparator 29, which compares the output signals of the circuits 26 and 28, to apply the signal from the photodetector at 1 or at 12, for which the threshold VCRE/2 is exceeded, to a sun detection circuit 31.

The threshold is determined and stored in 28 by an analog circuit until the next read-out of the shift registers. In this case, the threshold is identical for both detector arrays 1 and 12. It is therefore necessary to adapt the transmission as a function of the angle of incidence of the sun. In practice, the processing capabilities are then limited to a simple thresholding without interpolation possibility. From the sequencer 23 the circuit 31 also receives indications about the identity of the relevant detector position (pixel) at 1 or 12 and, if this is a pixel of the elevation photodetector 1, an identification of the slit, of the three possible slits, via which it has been exposed. This last-mentioned information obtained from the inertial unit 32 is transferred to the circuit 31 via an interface 33 and the sequencer 23. The date indication is also applied to the sequencer 23 via an interface 34 and a control and communication element 35. The circuit 31 forms the calculation means which supply the elevation and azimuth coordinates of the sun to the control and communication element 35 and then to the interface 34.

Analog signal processing in accordance with the circuit diagram of FIG. 3 provides a saving in electric power consumption, in volume and mass by integration of all the electronic functions in a single hybrid circuit, and in the cost of the series models, owing to the electronic integration.

Digital implementation can also be envisaged by replacing the part of the circuit in FIG. 3 marked in broken lines by the circuit shown in FIG. 4, which again includes the blocks 23, 26 and 31. In addition to these three blocks described hereinbefore, there is an analog-to-digital converter 38 whose output in the form of a digital video signal is applied to the circuit 31 via a FIFO memory 38 and to a threshold-determining circuit 41 arranged as a buffer between the sequencer 23 and the circuit 31. The optional FIFO 39 makes it possible to determine the threshold and to measure the position of the sun in the same integration phase of the signal, if desired. In order to obtain a high precision smaller than one minute of arc for the measured angles with this digital version, it is possible to effect an interpolation, which requires the selection of a plurality of pixels and a signal processing with a satisfactory amplitude resolution. For this purpose, the converter 38 preferably has a 12 bit resolution to cover the variations of the maximum signal, to allow for design tolerances, and to obtain an amplitude resolution better than one percent (typically 8 bits). This digital solution, for which a power consumption of the order of 5 W is anticipated, offers a potential for adaptation and future development.

It is current practice to direct an artificial satellite by means of star trackers or terrestrial horizon sensors. Some satellites, particularly small low-orbit satellites, for example of the observation type, orient themselves by means of a star tracker. Such an orientation remains possible while star tracking is not effected in the proximity of the sun, the latter masking the view of the stars in a light cone having an apex angle lying between 60° and 90°. In order to overcome this problem it can be envisaged to equip the satellite with two star trackers oriented in fairly different directions. However, instead of with a second star tracker, it can also be envisaged to equip the satellite with a sun sensor, preferably a two-axis sun sensor in accordance with the invention, which has the advantage that it is less expensive than a star tracker while having the same precision of the order of one minute of arc, typically between 40 and 80 seconds of arc, as regards pitch or yaw. For this application the platform of the attitude control unit of the satellite carries two sun sensors in accordance with the invention of the type shown in FIGS. 1A and 1B, disposed perpendicularly to one another as regards the direction of their arrays of photodetectors on the one hand and their slits on the other hand. It is to be noted that in this case the aperture angle along the insensitive axis, which dictates the length of the slits, is the same as the aperture angle along the sensitive axis, for each of the multi-slit sensors forming the sun sensor for a satellite.

The invention is not limited to sun sensors having 2 or 3 slits; indeed, since the precision of the inertial unit is of the order of 1°, i.e. adequate for specifying the angular sector of the field in which the sun is located, it is also possible to use an array comprising, for example, 1200 detectors in conjunction with 4 or 5 slits and even an array of 256 photodetectors in conjunction with some fifteen slits.

I claim:

1. A slit-type sun sensor which, as well as at least one coarse attitude detector, is connected to an attitude control system on a mobile craft, which sensor is of the kind using a linear array of photodetectors extending at an angle relative to a slit interposed between said array and the sun, characterized in that it comprises at least a first sun sensor having a plurality of slits disposed in parallel, each slit serving to detect a sector of the overall field of view of a first angular position of the sun to be measured, in such a manner that at least one of the photodetectors of said array is, always exposed to the sun said first sun sensor further comprising calculation means which receive, on the one hand, information about the exposure of said array to the sun and, on the other hand, information originating from said attitude control system, in combination with the date, indicating in which sector of the field of view the sun is situated, and which derive from said information the angular position of the sun in said overall field of view.

2. A slit-type sun sensor according to claim 1 further including a second slit-type sun sensor wherein said first sun sensor has a plurality of slits for measuring the elevation angle and said second sensor has a single slit for measuring the azimuth angle.

3. A slit-type sun sensor according to claim 1 further including a second sun sensor having a plurality of slits connected to an attitude control system for measuring the pitch angle and the yaw angle of an artificial satellite.

4. A slit-type sun sensor as claimed in claim 1 further comprising an attitude control system having at least one coarse attitude detector.

5. A slit-type sun sensor as claimed in claim 1, adapted to measure two angular positions of the sun in orthogonal planes, comprising, in a first plane, two arrays of photodetectors disposed in mutually perpendicular directions and, straight above each array, at right angles, a set of parallel slits, each disposed in a plane parallel to said first plane.

6. A slit-type sun sensor according to claim 5 further including a second sun sensor having a plurality of slits according to an attitude control system for measuring the pitch angle and the yaw angle of an artificial satellite.

7. A split-type sun sensor as claimed in claim 5 further comprising an attitude control system having at least one coarse attitude detector.

8. A slit-type sun sensor as claimed in claim 1, having three slits and an array comprising a number of photodetectors between 1500 and 2000 for measuring an overall field of view between 60° and 90° with a precision lying between 40 and 80 seconds of arc.

9. A slit-type sun sensor according to claim 8 further including a second slit-type sun sensor wherein said first sun sensor has a plurality of slits for measuring the elevation angle and said second sensor has a single slit for measuring the azimuth angle.

10. A split-type sun sensor as claimed in claim 8 further comprising an attitude control system having at least one coarse attitude detector.

* * * * *